(12) United States Patent
Jones et al.

(10) Patent No.: US 12,534,393 B2
(45) Date of Patent: Jan. 27, 2026

(54) STORMWATER COLLECTION SYSTEM WITH FILTRATION, RETENTION AND IRRIGATION OF LIVE PLANTINGS

(71) Applicant: CONTECH ENGINEERED SOLUTIONS LLC, West Chester, OH (US)

(72) Inventors: Warren Jones, Revesby (AU); Blake Allingham, Woolooware (AU); James Lenhart, Portland, OR (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 478 days.

(21) Appl. No.: 18/076,923

(22) Filed: Dec. 7, 2022

(65) Prior Publication Data

US 2024/0190740 A1   Jun. 13, 2024

(51) Int. Cl.
*C02F 3/32* (2023.01)
*E03F 1/00* (2006.01)
*C02F 103/00* (2006.01)

(52) U.S. Cl.
CPC .............. *C02F 3/327* (2013.01); *E03F 1/005* (2013.01); *C02F 2103/001* (2013.01)

(58) Field of Classification Search
CPC ...... C02F 3/327; C02F 2103/001; E03F 1/005
USPC ...................... 210/602, 747.2, 747.3, 170.03
See application file for complete search history.

(56) References Cited

U.S. PATENT DOCUMENTS

| | | |
|---|---|---|
| 2,084,005 A | 6/1937 | Richards |
| 6,769,213 B1 | 8/2004 | Cardarelli |
| 8,318,015 B2 | 11/2012 | Allen |
| 9,055,718 B2 | 6/2015 | Geerligs |
| 2008/0142438 A1 | 6/2008 | Kent |
| 2009/0255868 A1 | 10/2009 | Allen, II et al. |
| 2013/0180903 A1 | 7/2013 | Kowalsky |
| 2021/0114905 A1 | 4/2021 | Kent et al. |
| 2021/0340041 A1* | 11/2021 | Ellis ........................ C02F 1/001 |

FOREIGN PATENT DOCUMENTS

| | | |
|---|---|---|
| CA | 2195772 | 2/1996 |
| CA | 2930276 | 5/2015 |
| CN | 110629862 A * | 12/2019 |

(Continued)

OTHER PUBLICATIONS

Machine-generated English translation of KR 102228264, generated on Apr. 3, 2025.*

(Continued)

*Primary Examiner* — Fred Prince
(74) *Attorney, Agent, or Firm* — THOMPSON HINE LLP

(57) ABSTRACT

A stormwater collection system includes a planting bed containing live plant matter, and at least one collection chamber located within the planting bed and beneath or within the root zone of the live plant matter. The collection chamber defines a collection volume. The system includes one or more of (i) the collection chamber having a top side configured to define an initial collection zone for stormwater that infiltrates down through the planting bed, (ii) a capillary feed path to deliver stormwater into the collection chamber or (iii) a wick element that extends upward from the collection chamber within a pipe and into the root zone.

19 Claims, 6 Drawing Sheets

(56) References Cited

FOREIGN PATENT DOCUMENTS

| | | |
|---|---|---|
| CN | 110959511 | 4/2020 |
| EP | 1060655 | 11/2004 |
| EP | 1765055 | 3/2007 |
| FR | 2337991 A1 | 8/1977 |
| JP | 2012075356 A | 4/2012 |
| JP | 3198640 U | 7/2015 |
| KR | 102228264 B1 * | 3/2021 |
| SU | 1702962 A1 | 1/1992 |
| WO | WO-2006000048 A1 | 1/2006 |
| WO | WO-2009105808 A1 | 9/2009 |

OTHER PUBLICATIONS

Machine-generated English translation of CN 110629862, generated on Apr. 3, 2025.*
Mail Stop PCT, International Search Report and Written Opinion issued Apr. 23, 2024, which pertains to PCT Application No. PCT/US2023/082481. 8 pgs.
J.H. Knutson et al., Unsaturated Hydraulic Conductivities of Fiberglass Wicks and Designing Capillary Wick Pore-Water Samplers, Soil Sci Soc. Am. J. 58, 1994, pp. 721-729.
J.H. Knutson et al., Fiberglass Wick Preparation for Use in Passive Capillary Wick Soil Pore-Water Samplers, Soil Sci Soc. Am. J. 57, 1993, pp. 1474-1476.
Sally L. Boer et al., Wicking Up A Storm—Wicking Beds Delivering Resilient Urban Parklands, 2014, 13 pages.
Lance Edwards and Echo Staff, TN #95 100—Fold Vegetable Gardens with Low-Cost Wicking Beds, ECHO Technical Note No. 95, 2019, 21 pages.

* cited by examiner

STORMWATER COLLECTION SYSTEM WITH FILTRATION, RETENTION AND IRRIGATION OF LIVE PLANTINGS

TECHNICAL FIELD

This application relates generally to stormwater runoff filtration and retention systems and, more particularly, to such systems incorporating live plants.

BACKGROUND

In the past decade the use of Bio-Filtration and Bioretention have been extensively used throughout the US and other countries. These systems are used to manage water quality, peak flows, and the volume of stormwater runoff from impervious surfaces such as rooftops, parking lots and streets.

Bioretention is a process by which runoff is ponded on the surface of a vegetated depression and allowed to infiltrate into the ground or evapotranspirate into the atmosphere. Bio-Filtration is a similar process but rather than infiltrating into the ground, it is collected into a subsurface underdrain and discharged to a stormwater pipe network or surface waters. There are many design variants and combinations for these stormwater control measures (SCMs) or best management practices (BMPs), but the principal modes of operation remain the same with infiltration rates ranging from 3 to 10" per hour. One variant type uses engineered filtration media at much high rates on the order of 100-150 inches/hour.

One thing these SCMs have in common is the use of plant vegetation to transpirate soil moisture and gain benefit from the plant soils interactions in the root zone. This helps maintain permeability of the soil and provides physiochemical and biological for reactions to uptake and sequester stormwater borne pollutants.

For many of these systems, in regions with longer dry periods and areas subject to drought, there is a need for supplemental irrigation. Sometime irrigation pipes with controls are installed to periodically irrigate when needed (or not needed). Other times water is transported by water truck which draws water from municipal hydrants. In some cases, there is no irrigation at all which can cause water stress or plant death depending on the severity of the water shortage and the types of plants.

This is problematic as these approaches are considered as green infrastructure (GI) and the use of fuel, energy, and clean treated drinking water are costly and not consistent with the GI approach and sustainability. The use of a passive irrigation system to sustain plant growth during dry periods using water harvested from previous storms provides the needed supplemental irrigation which is more consistent with GI objectives and can reduce greenhouse emissions though reduced fuel costs for trucks and treatment/transmission costs for potable water. It also reduces the volume of water which runs off and allows it to be subjected evapotranspiration vs infiltrating or adding to increased pipe and stream water flows.

Wicking beds and wicking reservoirs have been commonly deployed in greenhouse and garden applications. These applications commonly use an external source of water such as potable water or water from a pond whereas this technology is design to use treated water from rainfall and stormwater runoff. In addition, many wicking systems utilize soil as the wicking medium which, in the case of polluted stormwater runoff, can lead to anaerobic conditions which are deleterious to the capture of stormwater pollutants such as heavy metals and nutrients such as phosphorous. In addition, fines can foul micropores in the wicks and cause them to fail.

SUMMARY

In one aspect, a stormwater collection system includes a planting bed for containing live plant matter, and at least one collection chamber located within the planting bed and beneath or within the root zone. The collection chamber defines a collection volume and has a top side configured to define an initial collection zone for stormwater that infiltrates down through the planting bed, and at least one feed path for delivering water from the initial collection zone down into the collection volume.

In another aspect, a stormwater collection system includes a planting bed for containing live plant matter, and at least one collection chamber located within the planting bed and beneath or within a root zone. The collection chamber defines a collection volume and has at least one capillary feed path for delivering water from external of the collection volume into the collection volume, the capillary feed path configured to reduce transfer of water born fines from external of the collection volume into the collection volume.

In a further aspect, a stormwater collection system includes a planting bed for containing live plant matter, and at least one collection chamber located within the planting bed and beneath or within a root zone. The collection chamber defines a collection volume. At least one conduit extends upward from the collection volume at least to the root zone of the planting bed, and at least one wick element extends from within the collection volume and up through the conduit.

Generally, the passive collection chamber(s) are used to capture water from, for example, a vegetated SCM such as a bioretention cell, a biofiltration cell or intensive green roof, but not exclusively. When water enters the SCM it is filtered through the SCM media and treated to some level of water quality. The treated water is then captured by a pan which lies above the collection chamber, which is located beneath the SCM filtration media. Positioned between the pan and the collection volume is an inverted laminar flow "capillary tape" which allows the water to flow through capillary channels into the collection volume below. This process helps prevent the transport of fines into the collection volume, which fines can adversely impact the operation of a wick or series of wicks. Though this configuration is advantageous, fluid communication between the pan and reservoir can, alternatively, be established by a series holes, screens or other method.

The number of the collection chambers used for a given installation is established with a computer model which can be used to calculate irrigation demand and duration with respect to the size of the SCM and climatic evapotranspiration data. Because runoff entering an SCM may not be evenly distributed, i.e. one end getting water in a small storm while the other end remains dry, the collection chambers can be interconnected to allow for uniform distribution of subsurface irrigation water storage.

Once water is captured in the collection chamber(s) it is available to provide water to the plant roots above via a single or series of wicks. The wicks provide a higher lift of water than soil, especially coarser grained soils used in SCMs, and can deliver sufficient water to fibrous and diffuse rooted plants with root zones above the collection chamber (s). In addition, the cleaner water in the collection chambers provides more storage volume than a reservoir filled with saturated soil, which can become anaerobic and allow fines to clog the capillaries of the wicking system.

The details of one or more embodiments are set forth in the accompanying drawings and the description below. Other features, objects, and advantages will be apparent from the description and drawings, and from the claims.

DETAILED DESCRIPTION

Figure 1:
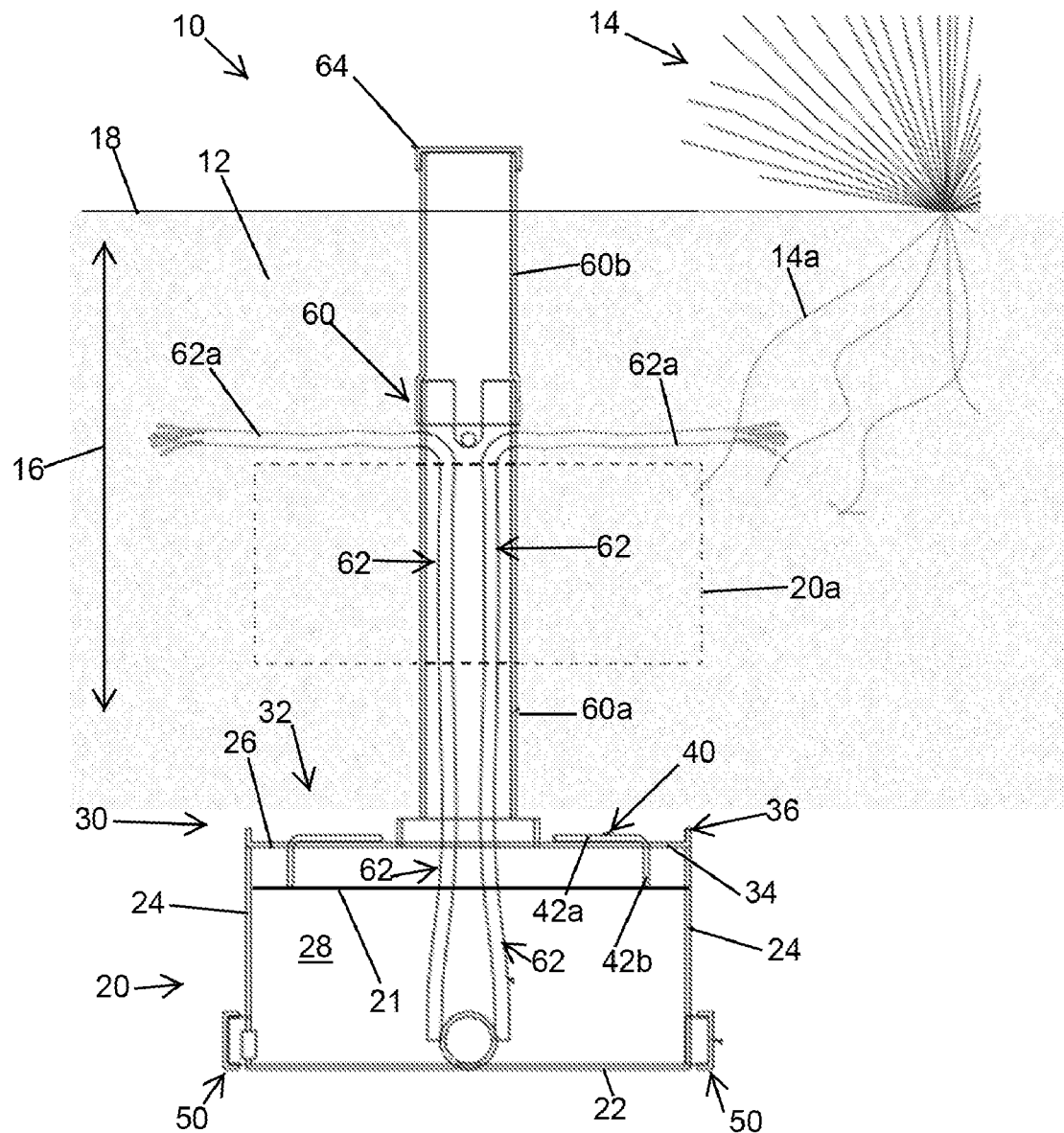
FIG. 1 is schematic side section elevation of a stormwater collection system.
Figure 2:
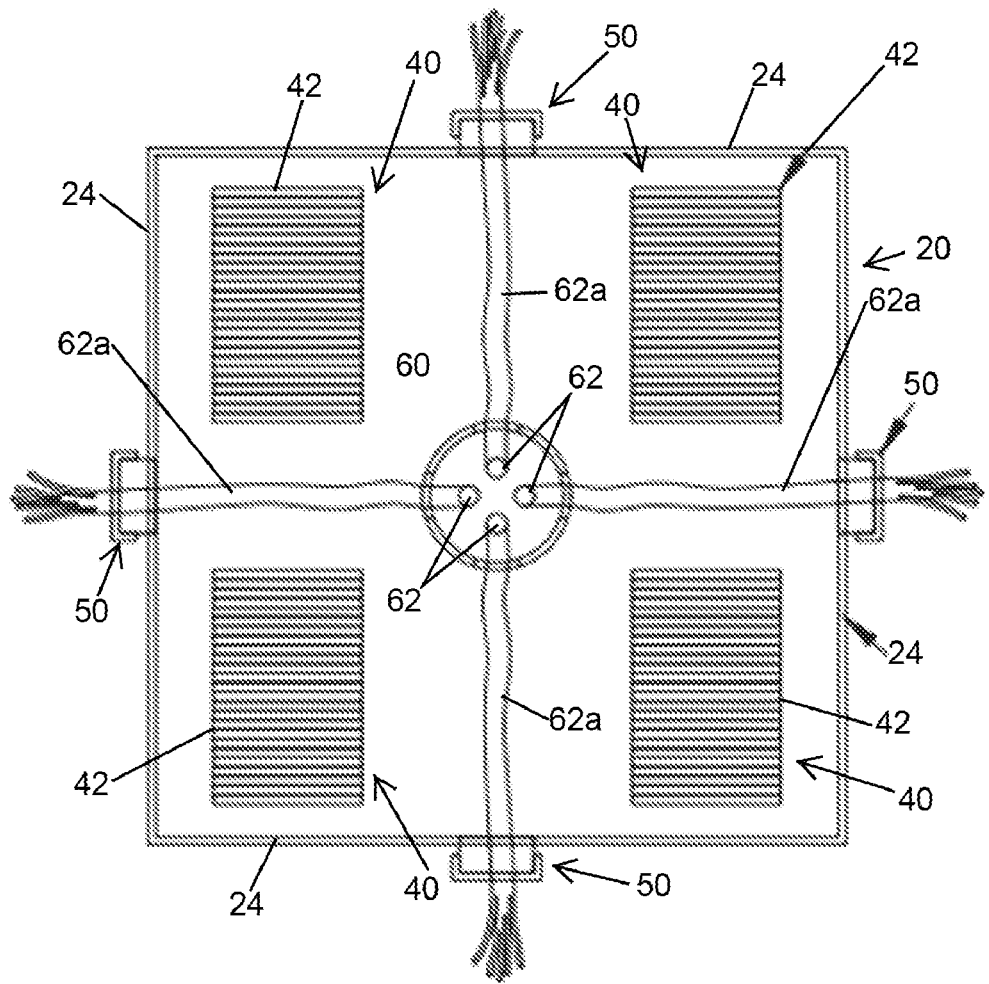
FIG. 2 is a plan view of the collection system of FIG. 1.

Referring to FIGS. 1 and 2, a stormwater collection system 10 includes a planting bed 12 containing live plant matter 14. A collection chamber 20 is located within the planting bed 12 and, here, beneath a root zone 16 (exemplified by the extent of the two-sided arrow) of the live plant matter 14. Typically, the root zone may be between about six inches to about twenty-four inches (e.g., six to eighteen inches) below the grade 18 of the bed, but variations are possible, depending on the nature of the live plant matter. In this regard, the live plant matter 14 may be any of shrubs, bushes, flowers, ground cover, trees, grasses etc., and combinations thereof. Embodiments in which the collection chamber is within the root zone are also possible (e.g., per the exemplary dash line collection chamber 20*a*).

Here, the collection chamber 20 includes a bottom wall 22, side walls 24 and top wall 26 to define an internal collection volume 28. Although the illustrated collection chamber 20 is box-shaped, other shape variations are possible. In one embodiment, the collection chamber may be of a roto-molded plastic material, but the use of other materials (e.g., metal or concrete) is possible. By way of example, the size of the collection volume 28 may be between about 2.0 to 4.0 cubic feet, but other size variations are possible, including much larger sizes. An exemplary water level 21 within the collection chamber is also shown.

The collection chamber 20 has a top side 30 configured to define an initial collection zone 32 for stormwater that infiltrates down through the planting bed 12. Here, the initial collection zone 32 is defined by a pan structure 34 at the top side of the collection chamber 20, wherein the pan structure 34 is formed by the top wall 26 and a set of interconnected pan edges 36 extending above the top wall 26 of the collection chamber. In one embodiment, the top wall 26 may be formed integral with the rest of the collection chamber 20. In an alternative embodiment, the top wall 26 may a separate component that is attached to the side walls 24 of the collection chamber 20. In one embodiment, the pan edges 36 may be formed integral with the top wall 26. In another embodiment, the pan edges may be integral portions/extensions of the side walls 24 (e.g., with the top wall recessed slightly below the tops of the side walls). The depth of the initial collection zone 32 is defined by the height that the pan edges 36 extend above the top wall 26, which may typically be on the order of between 1.0 and 4.0 centimeters, although other variations are possible.

One or more feed paths are provided for delivering water from the initial collection zone 32 into the internal volume 28. In the illustrated embodiment, multiple feed paths are provided in the form of capillary feed paths 40 configured to reduce transfer of water born fines from the initial collection zone 32 to the collection volume 28. Here, each capillary feed path comprises a capillary drain tape 42 passing through a wall of the collection chamber, with the capillary drain tape 42 including a first portion 42*a* in the initial collection zone 32 and a second portion 42*b* within the collection volume 28. Here, the capillary tapes pass through the top wall 26 of the collection chamber, but other variations are possible. The capillary drain tape 42 may be in the form of a ribbon of extruded plastic with numerous microchannels that move water, by capillary action, from the bed material in the initial collection zone 32 to the collection volume 28. By way of example, an exemplary capillary drain tape is available from Smart Drain LLC (www.smartdrain.com).

In alternative embodiments, the feed paths from initial collection zone 32 to the collection volume 28 may be formed by a combination of capillary feed paths and piping (e.g., where the capillary tapes feed into the pipe, and the pipes feed into the collection volume). In other embodiments, the capillary feed paths may be eliminated in favor of more traditional feed paths (e.g., small openings or screens or conductive fabric).

The collection chamber 20 also includes one or more lower inlet openings with capped pipe stub connections 50. Any one of the pipe stub connections 50 may be used to connect inflow pipes for delivering water (e.g., water from an upstream treatment device/system) into the collection volume 28 and/or outflow pipes for delivering water out of the collection volume.

The system 10 also includes a conduit 60 that extends upward from the collection volume 28 at least to the root zone 16 of the planting bed, and at least one wick element 62 (here four wick elements) extends from within the collection volume 28 (e.g., near the bottom of the volume), up through the conduit 60, and externally of the conduit such that an upper portion 62*a* of the wick element 62 is located in the root zone 16. The wick elements transfer water from the collection volume 28 to the root zone 16 via capillarity. Some period of time after installation of the system, the roots 14*a* of the live plant matter 14 intertwine with or otherwise surround the wick elements so as to readily take up moisture delivered by the wick elements. By way of example, the wick elements 62 may be processed fiberglass wick elements with a lift of at least 0.50 meters, such as a lift of at least 0.80 meters or at least 1.0 meters (e.g., a lift of between 0.80 and 1.20 meters).

Here, the conduit 60 extends upward above the grade 18 of the planting bed and the wick elements 62 pass through a wall of the conduit 60 to enter the root zone (e.g., the wick elements pass through openings in the conduit wall). The conduit 60 includes a removable top cap 64, such that the wick elements 62 are accessible through a top of the conduit when the top cap 64 is removed, enabling a status of the wick element to be checked or replaced. For example, maintenance personnel can pull the vertical portion of the wick element upward to check for flow blockage in the wick element. The conduit 60 may also be used to feed supplemental water into the collection volume 28 when conditions require it (e.g., during an extreme drought).

Here, the conduit 60 includes a lower conduit segment 60a extending upward from the collection chamber 20 and an upper conduit segment 60b extending downward from grade 18 and releasably connected to the lower conduit segment 60a (e.g., by a slip fitting or screwed connection).

Figure 3:
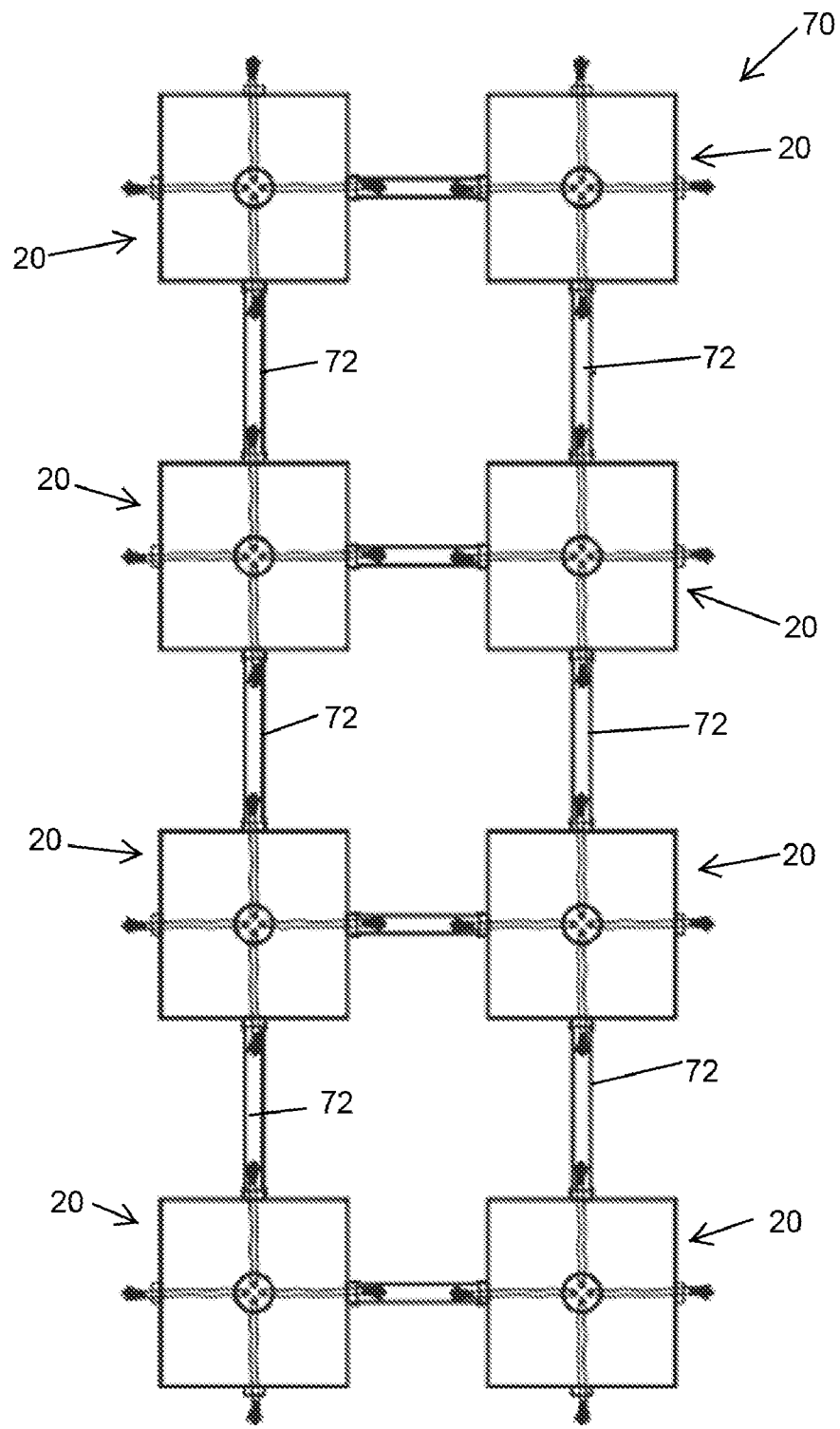
FIG. 3 is a plan view of a stormwater collection system including multiple interconnected collection chambers.
Figure 4:
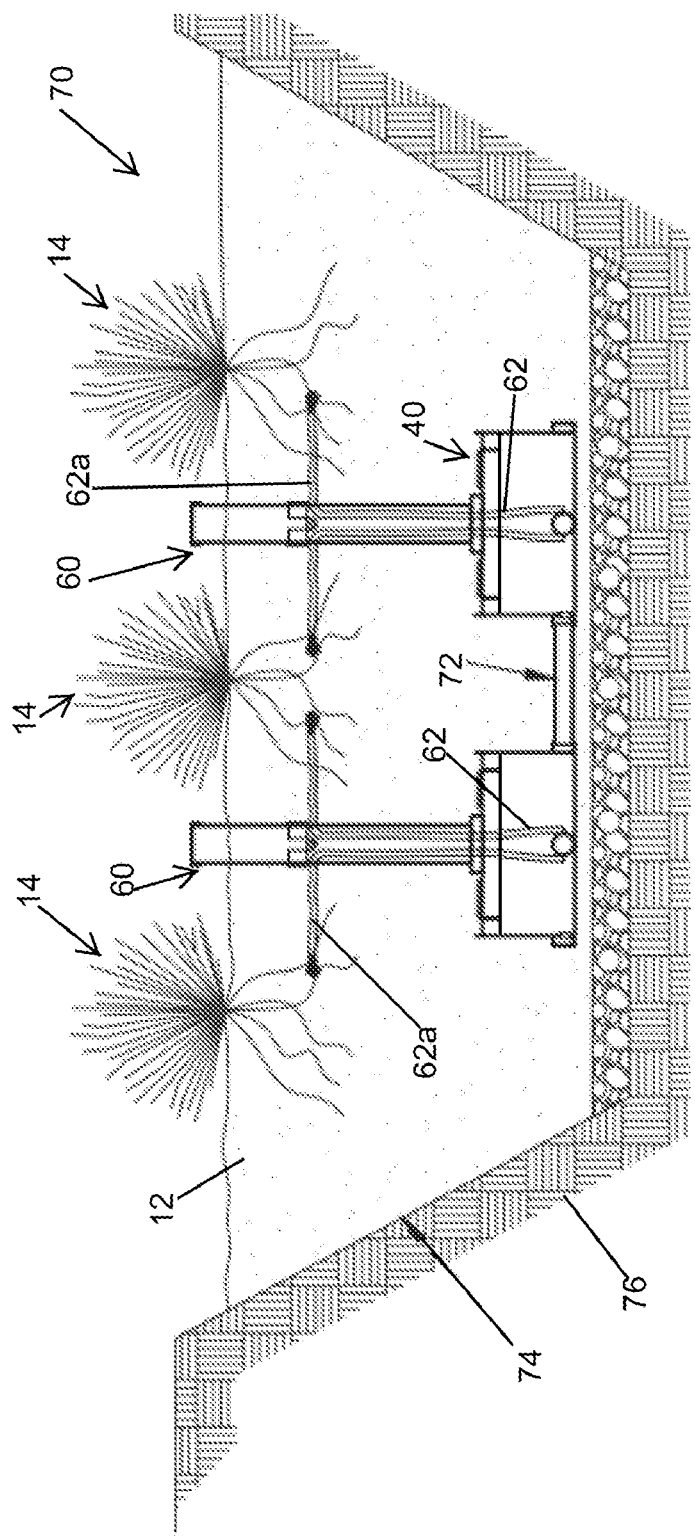
FIG. 4 is a side section elevation of the system of FIG. 3 in an exemplary bioretention cell configuration.

Although the illustrated system 10 includes a single collection chamber 20, it is contemplated that systems with multiple collection chambers will commonly be implemented. In this regard, referring to FIGS. 3-4, an exemplary bioretention planting bed system 70 is shown and includes multiple collection chambers 20, each of which has the features described above (e.g., initial collection zones 32, capillary feed paths 40, conduits 60 and wick elements 62). The collection chambers 20 are interconnected with each other by transfer pipes 72 for maintaining substantially similar water levels within the collection volumes of the chambers. In the system 70, the planting bed 12 is formed within a swale area bounded by walls 74 formed graded earthen material 76.

Figure 5:
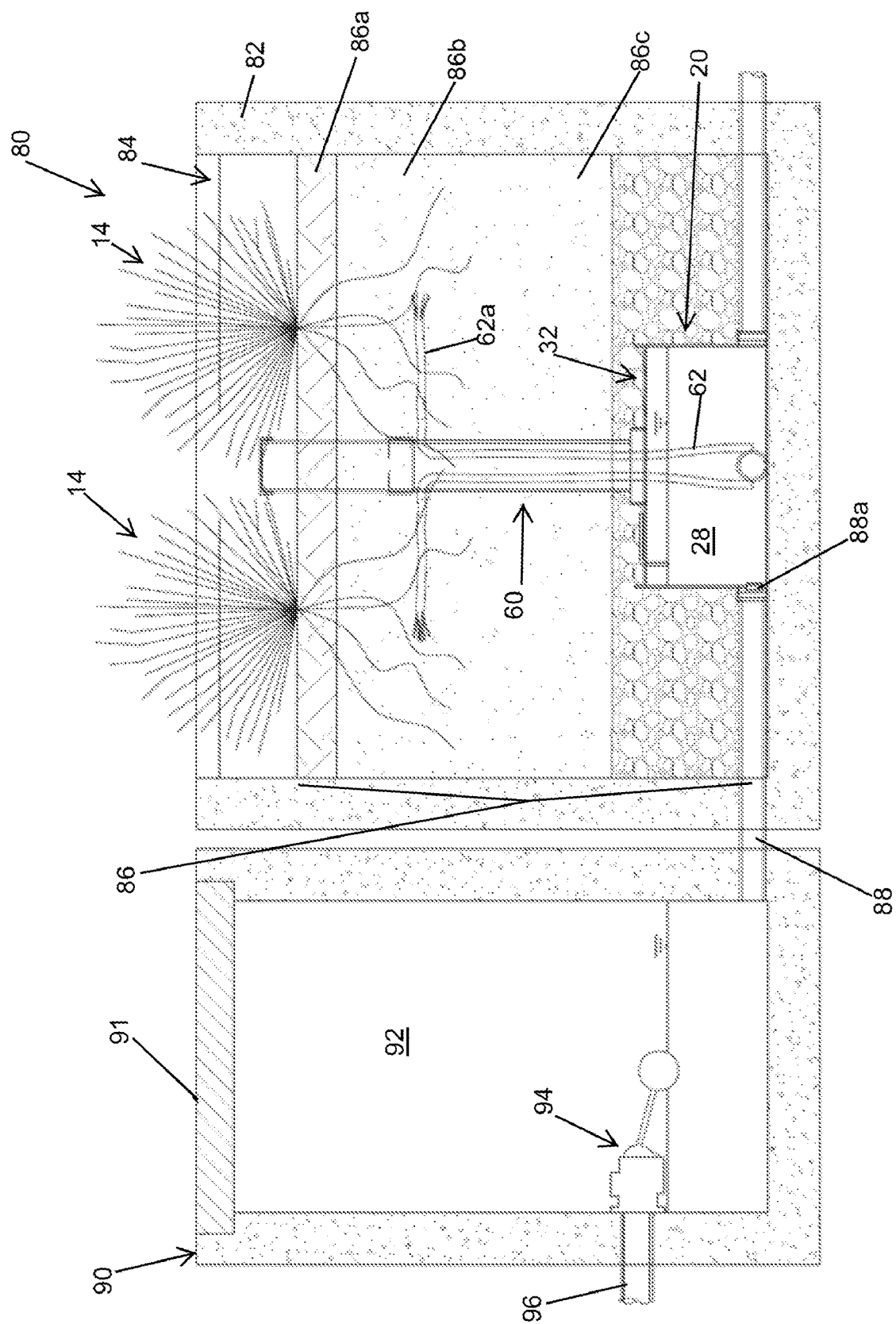
FIG. 5 is a side section elevation of a stormwater collection system implemented in a vault and that includes a refill reservoir.

In alternative embodiments, the planting bed may be formed in a manufactured unit. In this regard, and referring to FIG. 5, a bioretention system 80 includes a concrete vault 82 that defines a planting bed area 84. The planting bed 86 within the area may be a layered bed (e.g., with a top layer 86a of mulch, an intermediate layer 86b of soil or other suitable media and a bottom layer 86c of gravel/stone). A collection chamber 20 is located at the bottom of the bed (e.g., in the gravel/stone layer) and includes the initial collection zone 32, capillary feed paths 40, conduit 60 and wick elements 62. The collection volume 28 includes a piped connection 88 to a secondary vault/chamber 90 (e.g., a manhole or handhole with cover plate 91) that defines a refill reservoir 92. Given the piped connection 88, the water level in the reservoir 92 will typically be substantially the same as the water level in the collection volume 28. The piped connection 88 may include a one way valve 88a that only permits flow in the direction from the reservoir 92 to the collection chamber. A valve 94 (e.g., a float valve) is provided in the reservoir 92 and is triggered when the water level in the reservoir 92 falls below a threshold level, thereby opening to deliver water from an infeed pipe 96 into the reservoir 92 and on to the collection volume 28. The infeed pipe 96 may, for example, be connected to an irrigation pipeline, dedicated potable water line, water reuse line or a larger reservoir at a higher elevation than the collection chamber 20. In this manner, the system 80 can maintain sufficient water in the collection volume 28 to assure adequate water delivery to the plant matter 14.

For the purpose of wick replacement, the systems may be implemented with wick elements at predefined locations (e.g., every 90 degrees around the conduit as shown above). The conduits cap can be removed, and the wick elements 62 pulled upward and out of the conduit (e.g., cutting off the wick element at the internal surface of the pipe). Small trenches can be dug in the planting bed, along the known direction of the wick element portions 62a in the root zone, to remove those parts of the wick elements. New wick elements can then be inserted down through the conduit 62, withe upper portions passed through the openings in the conduit wall and pulled along the trenches. The trenches are then refilled. This methodology reduces disturbance of the root zone.

It is to be clearly understood that the above description is intended by way of illustration and example only, is not intended to be taken by way of limitation, and that other changes and modifications are possible. For example, systems that include the wicking arrangement but not the capillary infeed paths are possible. Likewise, systems that utilize the capillary infeed paths to the chamber volumes, for some purpose other than wicking systems, are also possible. Collection chambers that are cast into the base of concrete vaults, such as manholes, are also possible.

As used herein, the terminology "planting bed" encompasses the space from grade level downward that is either directly underneath an area where live plant matter is planted (or will be planted) or that is immediately surrounding where live plant matter is planted (or will be planted).

As used herein, the terminology referring to a component as "within the root zone" encompasses the component being entirely or only partly within the root zone.

Figure 6:
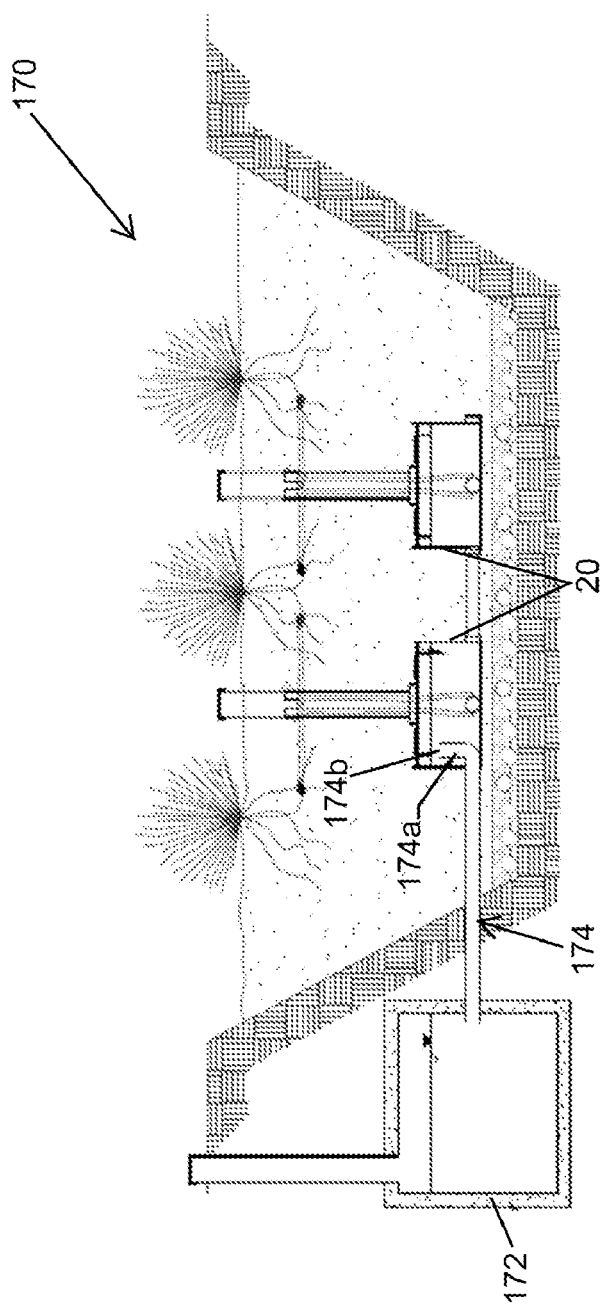
FIG. 6 is a side elevation of a stormwater collection system including an overflow tank that defines an overflow reservoir.

Referring to FIG. 6, a system 170 comparable to that of system 70 is shown, except that the system 170 includes an overflow tank 172 (e.g., metal, plastic or concrete) that is plumbed to one of the collection chambers 20 by piping 174. The piping 174 includes an upturned segment 174a within the collection chamber 20 and having an upper inlet 174b through which water can flow from the collection chamber to the overflow tank 172 when the water level in the collection chamber rises to the level of the piping inlet 174b. In this manner, water volumes that might normally exceed the volume of the collection chambers can be diverted to the overflow tank 172 and used for supplemental irrigation of adjacent landscape and water quality features (e.g., via a pump and water line system). The water in the overflow tank 172 can also be used as a source of recycled water for domestic uses given proper secondary treatment, if required by applicable regulations.

In some systems, the collection chambers 20 would not need to be used for wicking water up to the root zone. Instead, the collection chambers 20 could simply be used for rainwater harvesting.

What is claimed is:

1. A stormwater collection system, comprising:
   a planting bed for containing live plant matter;
   at least one collection chamber located within the planting bed and beneath or within a root zone;
   wherein the collection chamber defines a collection volume and has a top side configured to define an initial collection zone for stormwater that infiltrates down through the planting bed, and at least one feed path for delivering water from the initial collection zone down into the collection volume;
   wherein the at least one feed path is a capillary feed path that is configured to reduce transfer of water born fines from the initial collection zone to the collection volume;
   wherein the capillary feed path comprises a capillary drain tape passing through a wall of the collection chamber, the capillary drain tape includes a first portion in the initial collection zone and a second portion within the collection volume.

2. The system of claim 1, wherein the wall of the collection chamber is a top wall of the collection chamber.

3. The system of claim 1, wherein at least one conduit extends upward from the collection volume, and at least one wick element extends from within the collection volume and up through the conduit.

4. The system of claim 3, wherein the wick element further extends externally of the conduit such that an upper portion of the wick element is exposed within the planting bed.

5. The system of claim 4 wherein the upper portion of the wick element is within the root zone of the planting bed and transfers water from the collection volume to the root zone via capillarity.

6. The system of claim 1, wherein the collection chamber is piped to one of a refill reservoir or an overflow reservoir.

7. A stormwater collection system, comprising:
a planting bed for containing live plant matter;
at least one collection chamber located within the planting bed and beneath or within a root zone of the planting bed;
wherein the collection chamber defines a collection volume and has a top side configured to define an initial collection zone for stormwater that infiltrates down through the planting bed before reaching the initial collection zone, and at least one feed path for delivering water from the initial collection zone down into the collection volume;
wherein the initial collection zone is defined by a pan structure at the top side of the collection chamber, the pan structure located beneath a top of the planting bed.

8. The system of claim 7, wherein the pan structure is formed by a series of pan edges extending above a top wall of the collection chamber.

9. The system of claim 8, wherein the pan edges are formed by (i) upward extensions of side walls of the collection chamber or (ii) portions of the top wall of the collection chamber.

10. The system of claim 7 wherein the pan edges are integrally formed with the collection chamber.

11. A stormwater collection system, comprising:
a planting bed for containing live plant matter;
at least one collection chamber located within the planting bed and beneath or within a root zone;
wherein the collection chamber defines a collection volume and has a top side configured to define an initial collection zone for stormwater that infiltrates down through the planting bed, and at least one feed path for delivering water from the initial collection zone down into the collection volume;
wherein at least one conduit extends upward from the collection volume, and at least one wick element extends from within the collection volume and up through the conduit;
wherein the wick element further extends externally of the conduit such that an upper portion of the wick element is exposed within the planting bed;
wherein the upper portion of the wick element is within the root zone of the planting bed and transfers water from the collection volume to the root zone via capillarity;
wherein the conduit extends upward above a grade level of the planting bed and the wick element passes through a wall of the conduit to enter the root zone.

12. The system of claim 11, wherein the conduit includes a removable top cap, wherein the wick element is accessible through a top of the conduit when the top cap is removed.

13. The system of claim 11, wherein the conduit includes a lower conduit segment extending upward from the collection chamber and an upper conduit segment extending downward from grade level and releasably connected to the lower conduit segment.

14. A stormwater collection system, comprising:
a planting bed for containing live plant matter;
at least one collection chamber located within the planting bed and beneath or within a root zone;
wherein the collection chamber defines a collection volume and has at least one capillary feed path for delivering water from external of the collection volume into the collection volume, the capillary feed path configured to reduce transfer of water born fines from external of the collection volume into the collection volume;
wherein the capillary feed path comprises a capillary drain tape passing through a wall of the collection chamber, the capillary drain tape includes a first portion external of the collection volume and a second portion within the collection volume.

15. A stormwater collection system, comprising:
a planting bed for containing live plant matter;
at least one collection chamber located within the planting bed and beneath or within a root zone;
wherein the collection chamber defines a collection volume;
wherein at least one conduit extends upward from the collection volume at least to the root zone of the planting bed, and at least one wick element extends from within the collection volume and up through the conduit;
wherein the wick element further extends externally of the conduit such that an upper portion of the wick element is exposed within the planting bed;
wherein the upper portion of the wick element is within the root zone and the wick element transfers water from the collection volume to the root zone via capillarity;
wherein the conduit extends upward above a grade level of the planting bed and the wick element passes through a wall of the conduit to enter the root zone.

16. A method of handling stormwater, comprising:
(a) delivering stormwater into a collection chamber below or within a root zone of a planting bed; and
(b) delivering stormwater from within the collection chamber to the root zone via a wicking element that extends upward from the collection chamber within a pipe and then extends externally of the pipe into the root zone.

17. The method of claim 16, wherein the step (a) includes at least one of: (i) delivering stormwater into the collection chamber via a pipe, (ii) delivering stormwater into the collection chamber via a capillary feed path or (iii) delivering stormwater into the collection chamber through small openings or screens or a conductive fabric.

18. The method of claim 16, wherein the wicking elements extends through an opening in the wall of the pipe to reach the root zone.

19. The method of claim 16, wherein the pipe extends upward to a grade level of the planting bed, and the method further includes accessing the wicking element via a top of the pipe to evaluate the wicking element or to replace the wicking element.

* * * * *